(12) United States Patent
Yin et al.

(10) Patent No.: US 11,726,187 B2
(45) Date of Patent: Aug. 15, 2023

(54) HIGH RESOLUTION LOW POWER INTER-CORRELATION SPAD ASSISTED TIME-OF-FLIGHT SENSOR

(71) Applicant: Taiwan Semiconductor Manufacturing Co., Ltd., Hsinchu (TW)

(72) Inventors: Chin Yin, Hsin-Chu (TW); Meng-Hsiu Wu, Hsin-Chu (TW); Chih-Lin Lee, Toufen (TW); Calvin Yi-Ping Chao, Zhubei (TW); Shang-Fu Yeh, Hsin-Chu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 456 days.

(21) Appl. No.: 17/085,248

(22) Filed: Oct. 30, 2020

(65) Prior Publication Data

US 2022/0137192 A1 May 5, 2022

(51) Int. Cl.
*G01S 7/00* (2006.01)
*G01S 7/4865* (2020.01)
(Continued)

(52) U.S. Cl.
CPC .......... *G01S 7/4865* (2013.01); *G01S 7/4863* (2013.01); *G01S 17/894* (2020.01)

(58) Field of Classification Search
USPC ........................................................ 356/4.01
See application file for complete search history.

(56) References Cited

U.S. PATENT DOCUMENTS 11,199,444 B2 * 12/2021 Yin ..................... H03L 7/0812
11,520,019 B2 * 12/2022 Matsuura ................ G01S 7/487
(Continued)

FOREIGN PATENT DOCUMENTS

CN 111722239 A 9/2020
TW 202018329 A 5/2020
(Continued)

OTHER PUBLICATIONS

Takeo Ushinaga, Izhal Abdul Halin, Tomonari Sawada, Shoji Kawahito, Mitsuru Homma, and Yasunari Maeda "A QVGA-size CMOS time-of-flight range image sensor with background light charge draining structure", Proc. SPIE 6056, Three-Dimensional Image Capture and Applications VII, 605604 (Jan. 26, 2006), 9 pages; https://doi.org/10.1117/12.642022.
(Continued)

*Primary Examiner* — James R Hulka
(74) *Attorney, Agent, or Firm* — Duane Morris LLP

(57) ABSTRACT

An apparatus and method for providing a filtering false photon count events for each pixel in a DTOF sensor array are disclosed herein. In some embodiments, the apparatus includes: a light source configured to emit a modulated signal towards the object; a direct time of flight (DTOF) sensor array configured to receive a reflected signal from the object, wherein the DTOF sensor array comprises a plurality of single-photon avalanche diodes (SPADs); and processing circuitry configured to receive photon event detection signals from a center pixel and a plurality of pixels orthogonally and diagonally adjacent to the center pixel and output a valid photon detection signal, in response to determining whether a sum of the received photon event detection signals is greater than a predetermined threshold.

20 Claims, 13 Drawing Sheets

(51) Int. Cl.
 *G01S 7/4863* (2020.01)
 *G01S 17/894* (2020.01)

(56) References Cited

U.S. PATENT DOCUMENTS

| | | | | |
|---|---|---|---|---|
| 11,520,021 | B2* | 12/2022 | Kubota | G01S 7/4816 |
| 11,579,263 | B2* | 2/2023 | Yin | G01S 7/4863 |
| 2006/0202129 | A1* | 9/2006 | Niclass | G01S 17/894 |
| | | | | 250/370.14 |
| 2007/0182949 | A1* | 8/2007 | Niclass | G01S 7/491 |
| | | | | 356/3 |
| 2013/0300838 | A1* | 11/2013 | Borowski | G01S 7/4863 |
| | | | | 348/46 |
| 2014/0374533 | A1* | 12/2014 | Ell | F42B 15/01 |
| | | | | 244/3.15 |
| 2015/0041625 | A1* | 2/2015 | Dutton | G01T 1/2985 |
| | | | | 341/166 |
| 2017/0139041 | A1* | 5/2017 | Drader | G01S 7/487 |
| 2019/0165792 | A1* | 5/2019 | Huh | H03L 7/0802 |
| 2019/0257950 | A1* | 8/2019 | Patanwala | G01S 17/14 |
| 2019/0259902 | A1* | 8/2019 | Shimizu | H01L 27/1446 |
| 2019/0265356 | A1 | 8/2019 | Ueno | |
| 2020/0018642 | A1* | 1/2020 | Yin | G01S 7/4865 |
| 2020/0174105 | A1* | 6/2020 | Yin | G01S 7/4865 |
| 2020/0300984 | A1 | 9/2020 | Matsuura | |
| 2020/0300985 | A1* | 9/2020 | Kubota | G01S 7/4817 |
| 2020/0326414 | A1* | 10/2020 | Delic | G01S 7/4863 |
| 2020/0408885 | A1* | 12/2020 | Yin | H03L 7/0816 |

FOREIGN PATENT DOCUMENTS

| | | | | |
|---|---|---|---|---|
| TW | 202026606 | A | 7/2020 | |
| WO | WO-2017002715 | A1 * | 1/2017 | H01L 27/14 |
| WO | WO-2017002717 | A1 * | 1/2017 | G02B 5/30 |

OTHER PUBLICATIONS

M. Perenzoni, D. Perenzoni and D. Stoppa, "A 64 x 64-Pixels Digital Silicon Photomultiplier Direct TOF Sensor With 100-MPhotons/s/pixel Background Rejection and Imaging/Altimeter Mode With 0.14% Precision Up to 6 km for Spacecraft Navigation and Landing," in IEEE Journal of Solid-State Circuits, vol. 52, No. 1, pp. 151-160, Jan. 2017, doi: 10.1109/JSSC.2016.2623635.

M. Lee and A. A. Abidi, "A 9 b, 1.25 ps Resolution Coarse-Fine Time-to-Digital Converter in 90 nm CMOS that Amplifies a Time Residue," in IEEE Journal of Solid-State Circuits, vol. 43, No. 4, pp. 769-777, Apr. 2008, doi: 10.1109/JSSC.2008.917405.

S. Lee, Y. Seo, H. Park and J. Sim, "A 1 GHz ADPLL With a 1.25 ps Minimum-Resolution Sub-Exponent TDC in 0.18 um CMOS," in IEEE Journal of Solid-State Circuits, vol. 45, No. 12, pp. 2874-2881, Dec. 2010, doi: 10.1109/JSSC.2010.2077110.

H. Kwon, J. Lee, J. Sim and H. Park, "A high-gain wide-input-range time amplifier with an open-loop architecture and a gain equal to current bias ratio," IEEE Asian Solid-State Circuits Conference 2011, Jeju, 2011, pp. 325-328, doi: 10.1109/ASSCC.2011.6123579.

C. Niclass, C. Favi, T. Kluter, M. Gersbach and E. Charbon, "A 128 x 128 Single-Photon Image Sensor With Column-Level 10-Bit Time-to-Digital Converter Array," in IEEE Journal of Solid-State Circuits, vol. 43, No. 12, pp. 2977-2989, Dec. 2008, doi: 10.1109/JSSC.2008.2006445.

* cited by examiner

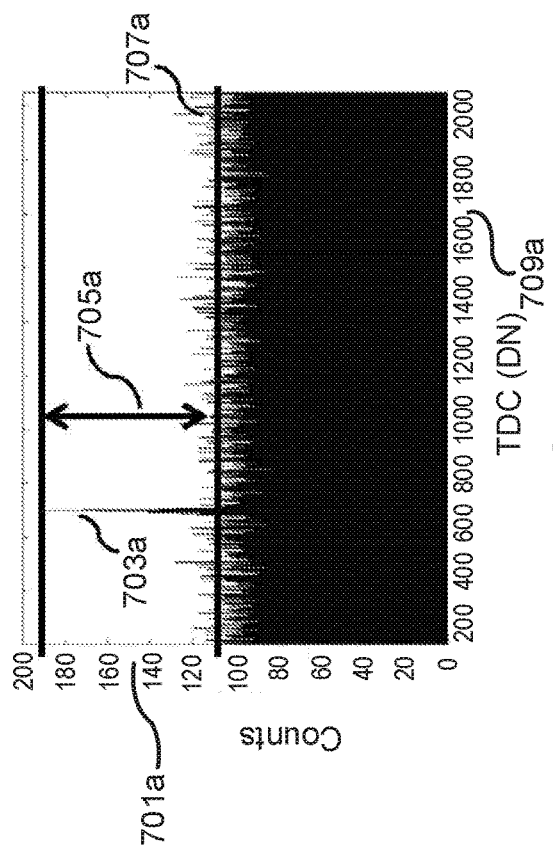
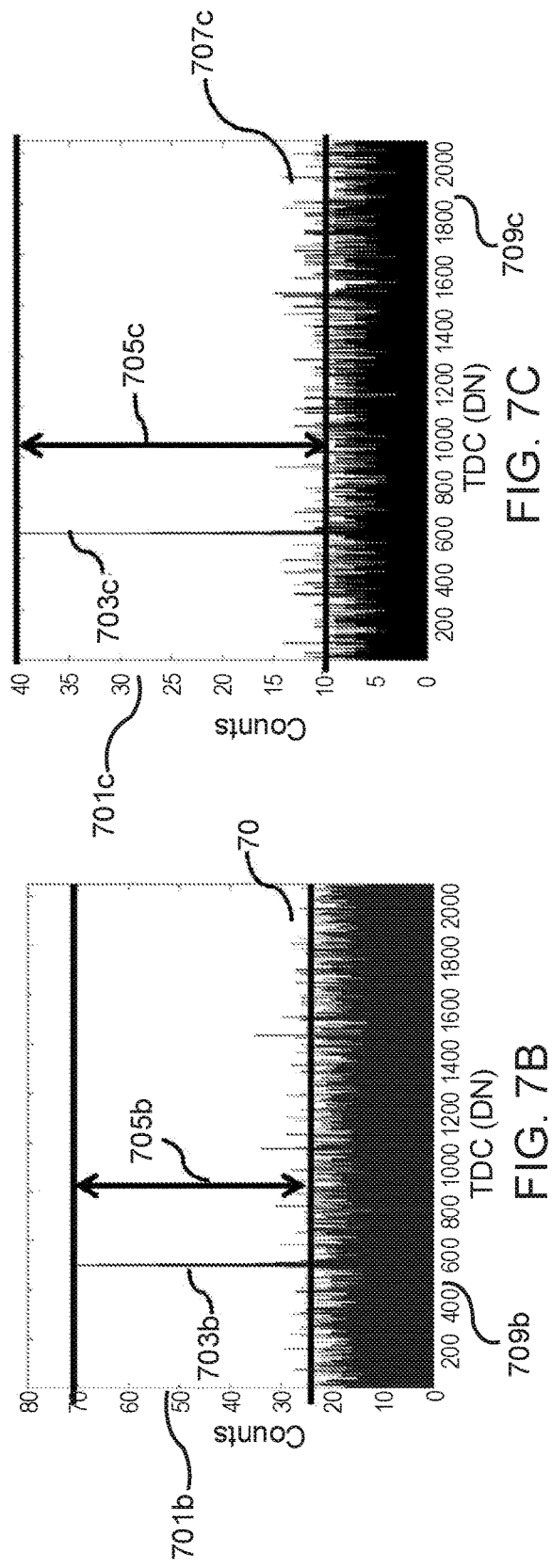
FIG. 7A
FIG. 7B
FIG. 7C

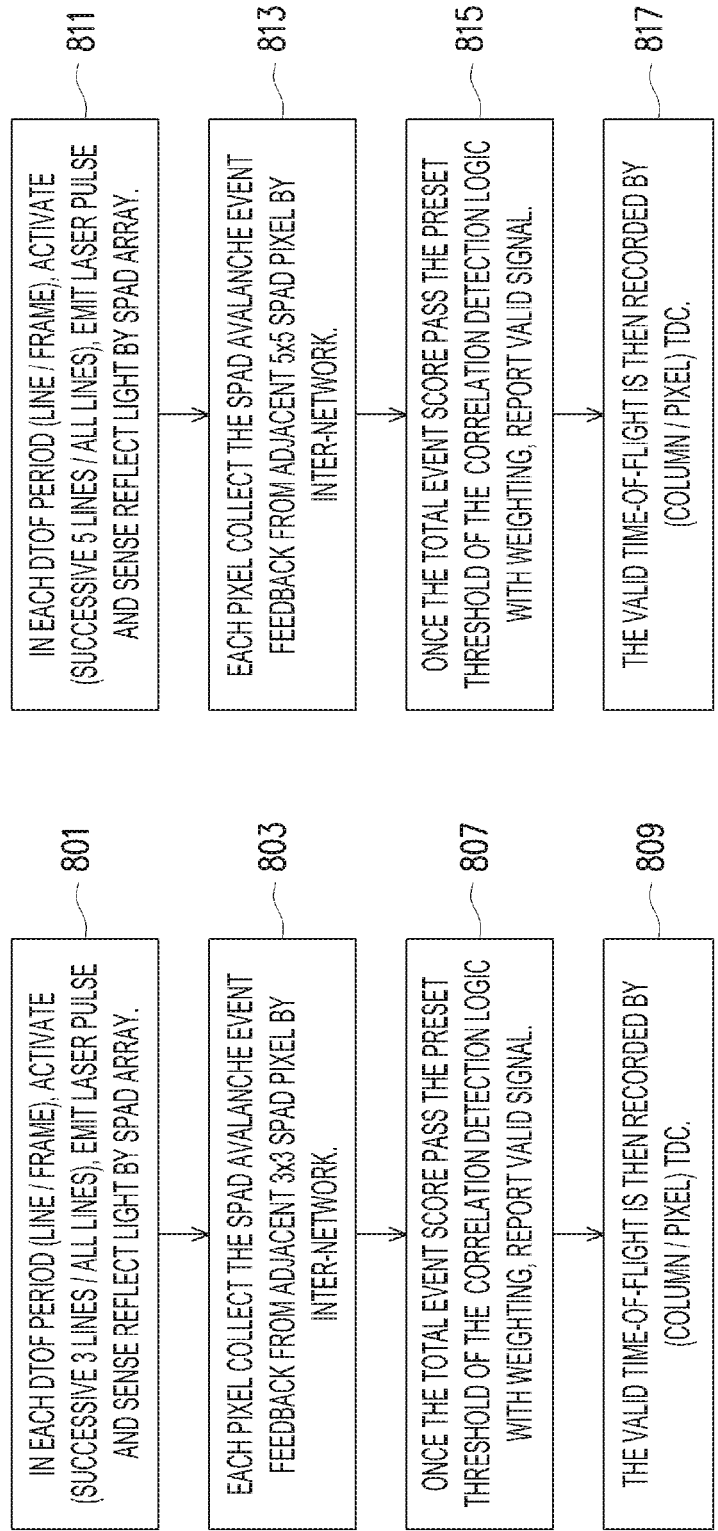

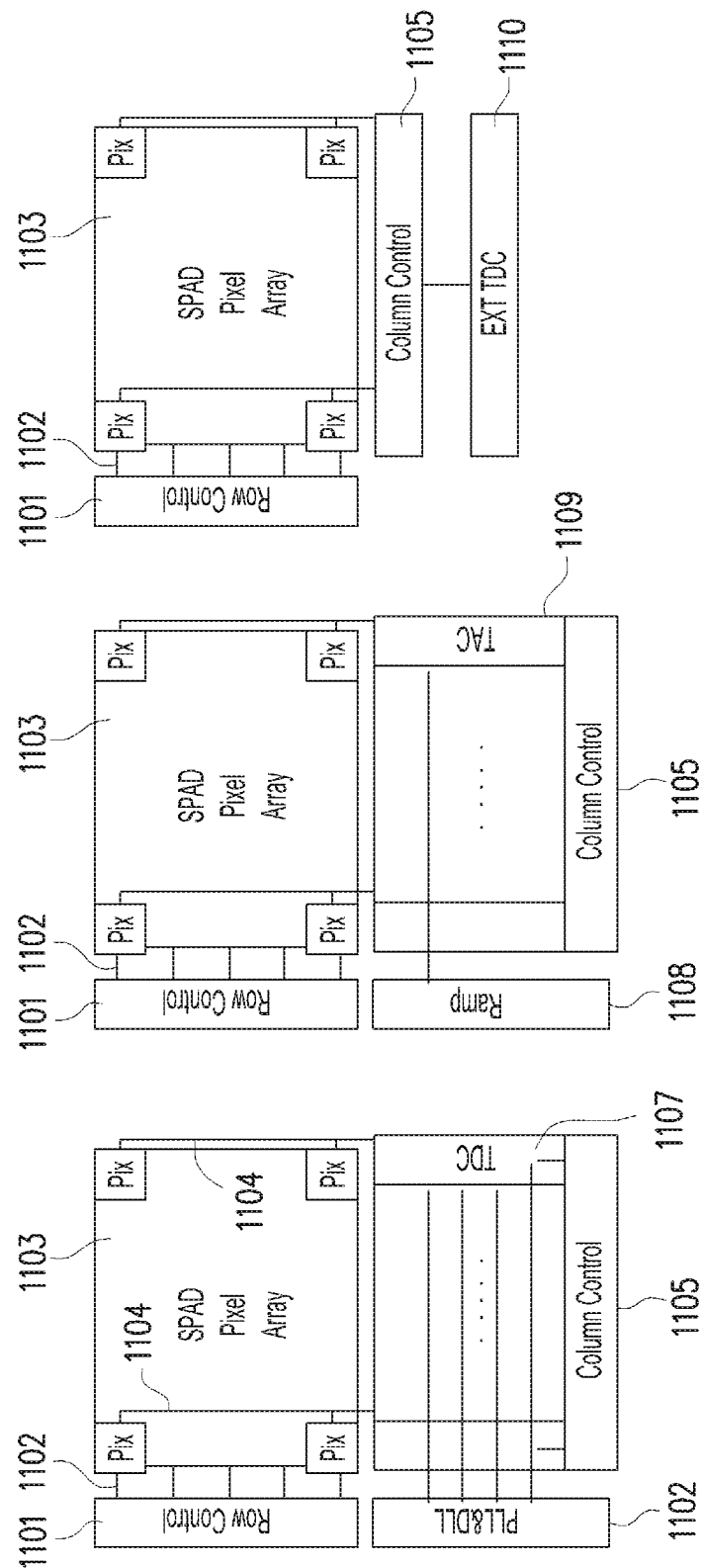

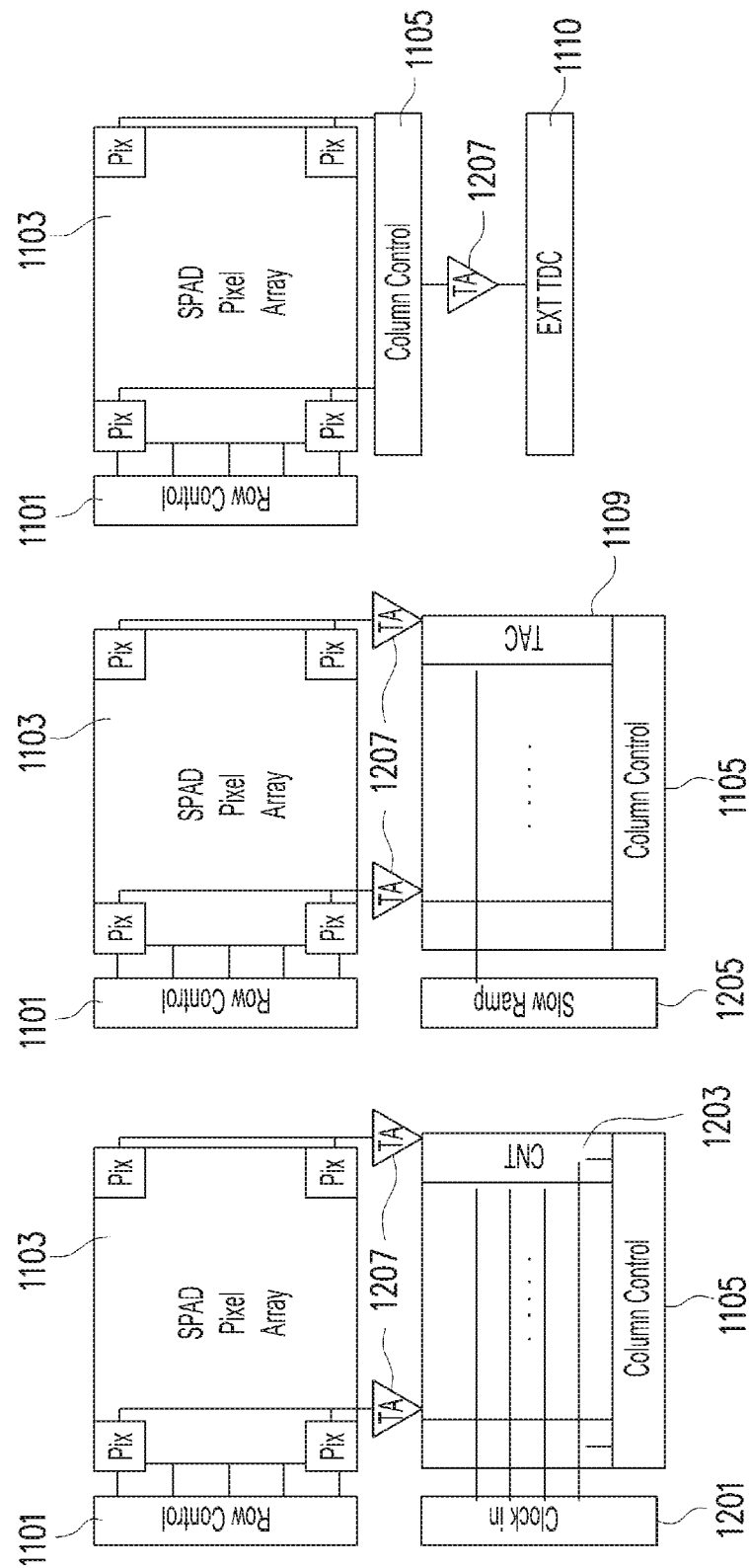

HIGH RESOLUTION LOW POWER INTER-CORRELATION SPAD ASSISTED TIME-OF-FLIGHT SENSOR

BACKGROUND

Ranging sensors capable of three dimensional environment sensing are used in a variety of applications such as autonomous driving, medicine, robotic vision, security, etc. Current methods of 3-D sensing utilize one of stereo-matching, light-section, or time-of-flight (TOF) approach. The stereo-matching method determines a distance to an object by triangulating features on the object using two cameras, which are spatially positioned relative to each other according to a preset spatial configuration. However, the stereo-matching method may provide inaccurate 3-D range measurements if there is a mismatch between the two cameras. Another disadvantage of the stereo-matching method is that it requires a passive illumination of the observed object. The light-section method is based on triangulation of the laser beam projected onto an object. However, this technique requires expensive moving mechanical parts such as lasers and detectors. On the other hand, the time-of-flight (TOF) technique does not require any mechanical parts and may capture a 3-D range map close to a very high frame rate. Moreover, 3-D range measurements sensors, based on the time-of-flight (TOF) technique, have a small footprint and a relatively low manufacturing cost. Furthermore, TOF 3-D ranging sensors are based on determining, either directly (direct TOF (DTOF)) or indirectly (indirect TOF (ITOF)), the delay between the light pulses emitted by an illuminator and a received reflected signal detected by a TOF 3-D ranging sensor.

The DTOF approach is typically used in applications requiring long (kilometers) range measurements with very high depth resolution, whereas the ITOF approach is mainly used in applications requiring short to medium (tens of meters) range measurements with depth resolutions of few centimeters. Thus, implementation of the DTOF technique in application requiring a long range and high resolution measurements can be advantageous over to the ITOF technique.

However, the performance of DTOF sensors based on DTOF technique may be degraded in the presence of noise sources such as a dark-count rate (DCR) and a background illumination noise due to high-sensitivity of the DTOF sensors to noise. For example, the thermally generated carriers associated with the dark count may trigger the DTOF sensor generating a false photon count event, which may result in an inaccurate range measurement.

Current methods for reducing false photon count events in the DTOF sensors focus on adding a plurality of redundant Single-Photon Avalanche Diodes (SPADs) to the DTOF sensor array, which dramatically increases its footprint and power consumption, and limits the implementation of the DTOF sensors to a few pixels, which decreases the image resolution. Therefore, current methods for filtering false photon count events in the DTOF sensors are not entirely satisfactory.

The information disclosed in this Background section is intended only to provide context for various embodiments of the invention described below and, therefore, this Background section may include information that is not necessarily prior art information (i.e., information that is already known to a person of ordinary skill in the art). Thus, work of the presently named inventors, to the extent the work is described in this background section, as well as aspects of the description that may not otherwise qualify as prior art at the time of filing, are neither expressly nor impliedly admitted as prior art against the present disclosure.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

FIGS. 7A-7C illustrates photon count histograms obtained from a single pixel under various threshold settings, in accordance with some embodiments.

FIGS. 8A-8B illustrate flowcharts of noise filtering methods in a DTOF sensor, in accordance with some embodiments.

FIGS. 11A-11C schematically illustrate planer floor plans of an exemplary DTOF sensor.

FIGS. 12A-12C schematically illustrate planer floor plans of an exemplary DTOF sensor with time amplifiers connected between SPAD detectors and associated time stamping circuitry.

DETAILED DESCRIPTION

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

Figure 1:
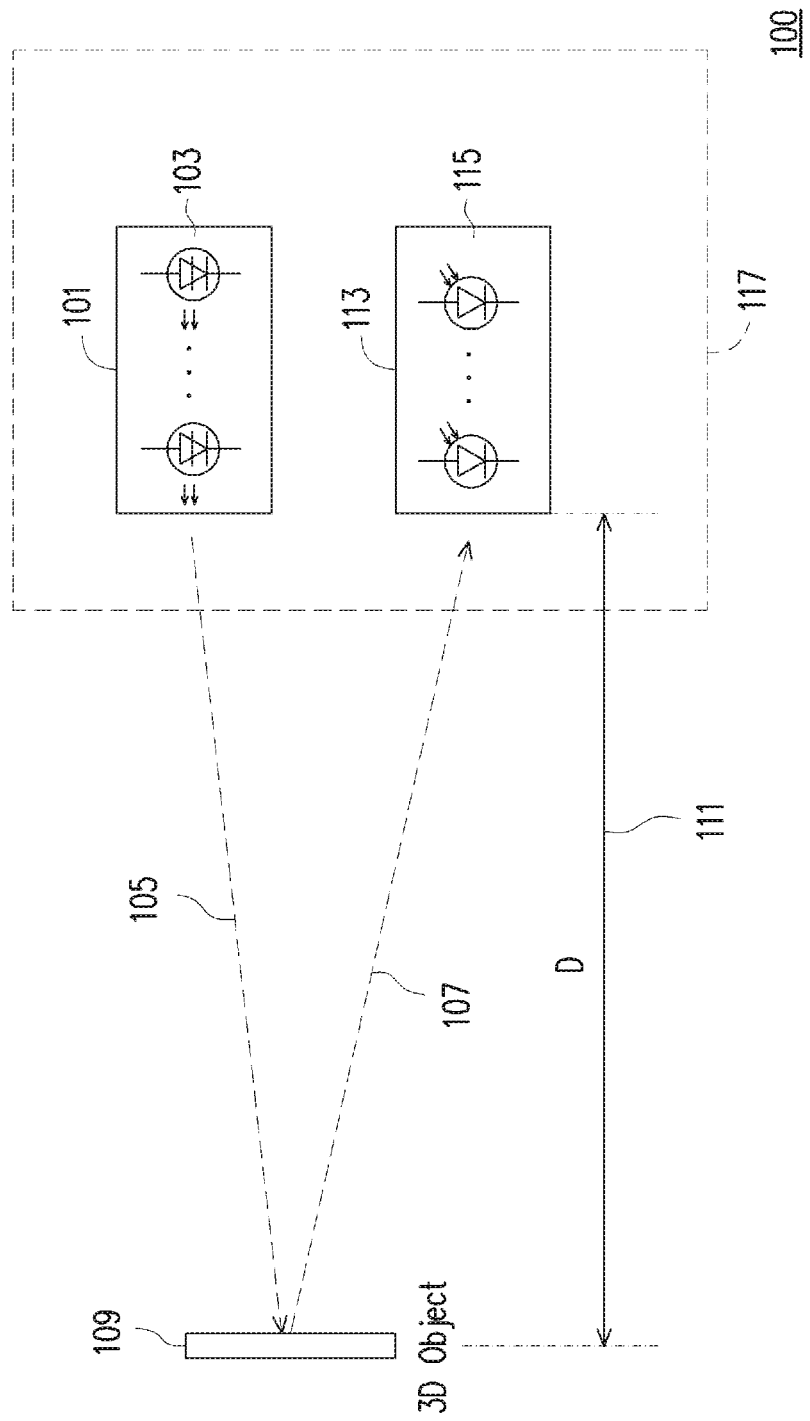
FIG. 1 illustrates a block diagram of a 3-D range sensing system with a pulse modulated light source and DTOF sensor array, in accordance with some embodiments of the present disclosure.

FIG. 1 illustrates a 3-D range sensing system 100 that measures a distance 111 from a DTOF sensor 117 to a 3D object 109. In one embodiment, a light source 101 emits a modulated signal 105 towards the 3D object 109. In some embodiment, the light source 101 may include an array of Light-Emitting Diodes (LEDs) or solid-state lasers 103 such as Vertical-Cavity surface-emitting lasers (VCSEL) with wavelengths in the range of 850 nanometers (nm)-870 nm. In some embodiments, the modulated signal 105 may be a square wave or a continuous-wave such as a sinusoid. In some embodiments, the modulated signal 105 may be periodically generated with a predetermined periodicity. In another embodiment, the modulated signal 105 may be generated using digital circuitry including ring oscillators and counters.

A reflected signal 111 is reflected from the 3D object 109 and detected by a DTOF sensor array system 115. In some embodiments, the DTOF sensor array system 115 may include a 2-dimensional array of light receivers 113. In some embodiment, the DTOF sensor array system 115 may be implemented by SPAD light receivers. As illustrated in FIG. 1, the DTOF sensor 117 operates by measuring a roundtrip travel time $T_d$ of photons emitted from the light source 101 and captured by the sensor array 115 system. The roundtrip travel time of photons carried in the modulated signal 105 and the reflected signal 107 is determined by measuring the phase delay of the reflected signal 107 from the modulated signal 105. The distance D 111 is then determined by $$D = \frac{1}{2}cT_d,$$

where c is the speed of light in a material medium in which the 3D Object 109 and the DTOF sensor 117 are located, and $T_d$ is the roundtrip travel time of photons emitted from the light source 101 and captured by the sensor array system 115.

Figure 2:
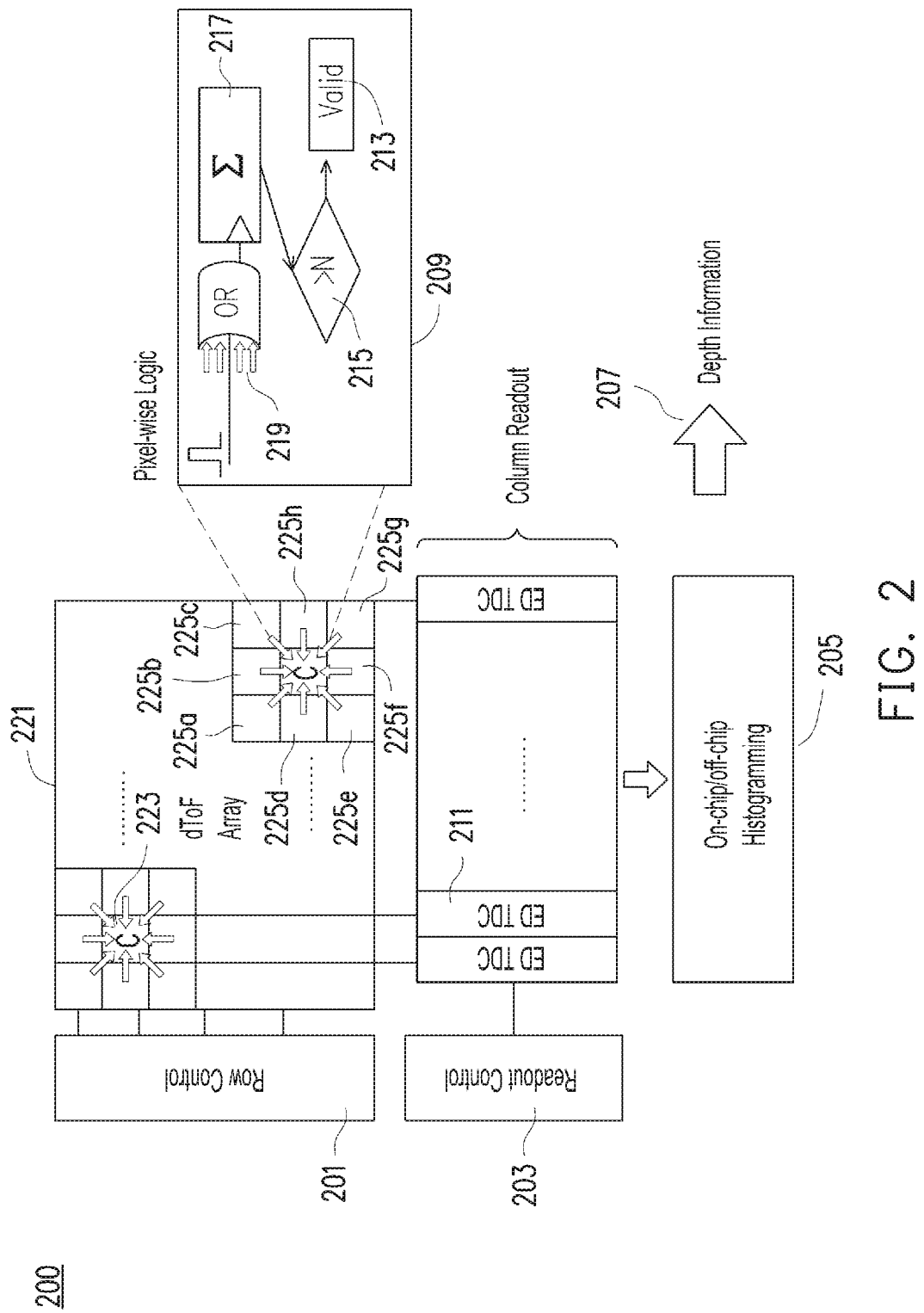
FIG. 2 illustrates a block diagram of the DTOF sensor array with a 3 by 3 pixel wise inter-correlation photon detection system, in accordance with some embodiments of the present disclosure.

FIG. 2 illustrates a block diagram of a DTOF sensor array system 200, in accordance with some embodiments. The DTOF sensor array system 200 comprises a two dimensional square array of pixels 221 including pixels 223 and 225a-225h, each having a SPAD light detector. In some embodiments, the SPAD light detectors may be implemented using Complementary Metal Oxide Semiconductor (CMOS) technology. The DTOF sensor array system 200 further includes signal processing circuitry coupled to the DTOF sensor array 221. In some embodiments, the signal processing circuitry includes a row control logic circuit 201, which selects a row from the two dimensional array of pixels 221, and a column readout logic circuit 203 configured to select a column from the two dimensional array of pixels 221. In accordance with some embodiments, the column readout logic 203 may include a plurality of time to digital converters (TDCs) 211 configured to quantize time intervals between rising edges of the emitted signal and the reflected signal. In some embodiments, the DTOF sensor array system 200 provides depth information 207 generated by a histogramming logic circuit 205, which accumulates the quantized time interval measurements generated by TDCs 211 into a statistical representation such as a histogram of photon event detection signals against quantized time measurements. In some embodiments, the histogram logic circuit 205 may be implemented on-chip or off-chip.

In addition, the DTOF sensor array system 200 may include a pixel wise signal processing circuit 209 configured to filter false photon event detection signals received by the pixel 223, as shown in FIG. 2. In various embodiments, the pixel wise signal processing circuit 209 may include a logic gate 219 configured to transition its binary output state based on receiving a photon event detection signal from either of pixels 225a-225g or 221, for example. The pixel wise signal processing circuit 209 may also include a counter logic circuit 217 that is triggered by the transition of the binary output state of the logic gate 219 and is configured to count the number of received photon event detection signals. In some embodiments, as shown in FIG. 2, the pixel wise signal processing circuit 209 may include a thresholding logic circuit 215 that compares the output of the counter logic 217 with a predetermined threshold N. In various embodiments of the present disclosure, the thresholding logic 215 may be a magnitude comparator that compares the input received from the counter logic 217 with the predetermined threshold N to determine whether the input received from the counter logic 217 is greater than the predetermined threshold N. In some embodiments, the predetermined threshold N is an integer greater than 1. In some embodiments, N is an integer value in the range of 2 to 5. In addition, the pixel wise signal processing circuit 209 may include a two state machine 213 configured to change its state based on the output of the thresholding logic 215. For example, the two state machine 213 changes its state to "valid" if the output of the thresholding logic 215 indicates that the input received from the counter logic 217 is greater than the predetermined threshold N. In some embodiments, an exemplary advantage of the pixel wise signal processing circuit 209 is that it reduces effects of dark-count rate (DCR) and a background illumination noise by processing inter-correlated photon detection events received from either of pixels 225a-225g or 223.

FIG. 3A illustrates a 3 by 3 subarray 301 of the DTOF sensor array comprised of a center pixel 303, a plurality of pixels 307a located diagonally adjacent to the center pixel 303, and a plurality of pixels 305a-305d located orthogonally adjacent to the center pixel 303, respectively.

Figure 3:
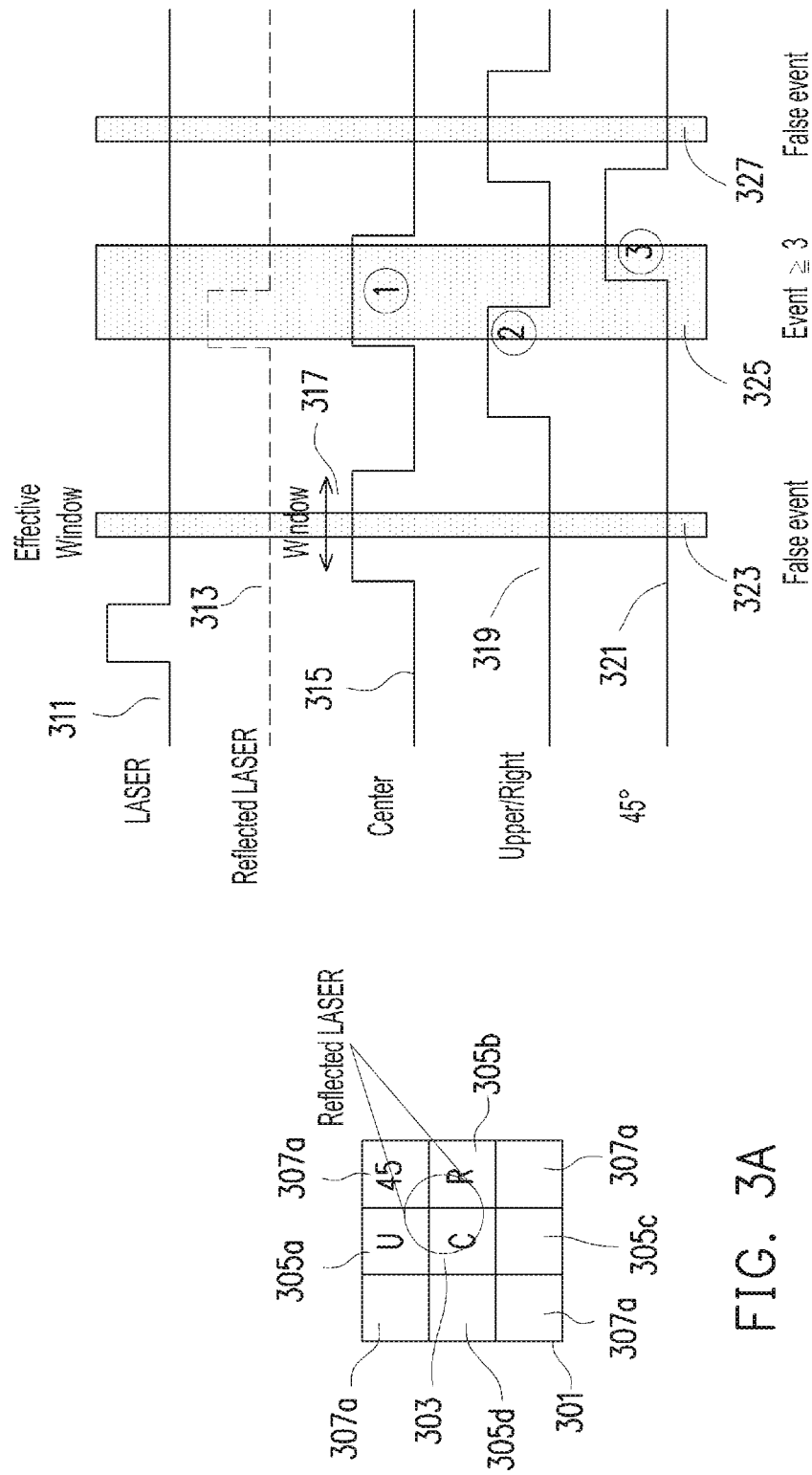
FIG. 3A illustrates a 3 by 3 subarray of the DTOF sensor array, in accordance with some embodiments.
FIG. 3B illustrates a timing diagram of a modulated signal transmitted from the light source and a reflected signal received at the DTOF sensor array, in accordance with some embodiments.

The timing diagram shown in FIG. 3B provides a graphical example of the inter-correlated photon detection approach, in accordance with some embodiments of the present disclosure. As such, FIG. 3B shows the timing diagram of a modulated signal 311 emitted from the light source and a reflected signal 313. Moreover, FIG. 3B also illustrates the timing diagrams of reflected signals 315, 319, and 321 incident on a 3×3 subarray, as depicted in FIG. 3A. The reflected signals 315, 319, and 321, generated by the SPAD light receivers of the DTOF sensor array, have a predetermined pulse width 317. Furthermore, FIG. 3 shows examples of false photon event detection signals 323 and 327 generated by the center pixel 303 and a pixel orthogonally adjacent to the center pixel 303. In this regard, the false photon event detection signals 323 and 327 may be due to the DCR or the background noise.

FIG. 3B also illustrates a valid photon event detection signal 325. In some embodiments, the valid photon event detection signals is detected when the center pixel 303 and at least two other adjacent pixels generate pulses anytime within an effective window. In this embodiment, the center pixel 303 registers a valid photon event detection signal when the number of photon event detection signals received from the orthogonally and diagonally adjacent pixels is at least two. In other embodiments, the width of the effective window may be the same as the pulse width of the reflected signals 315, 319, and 321.

Figure 4:
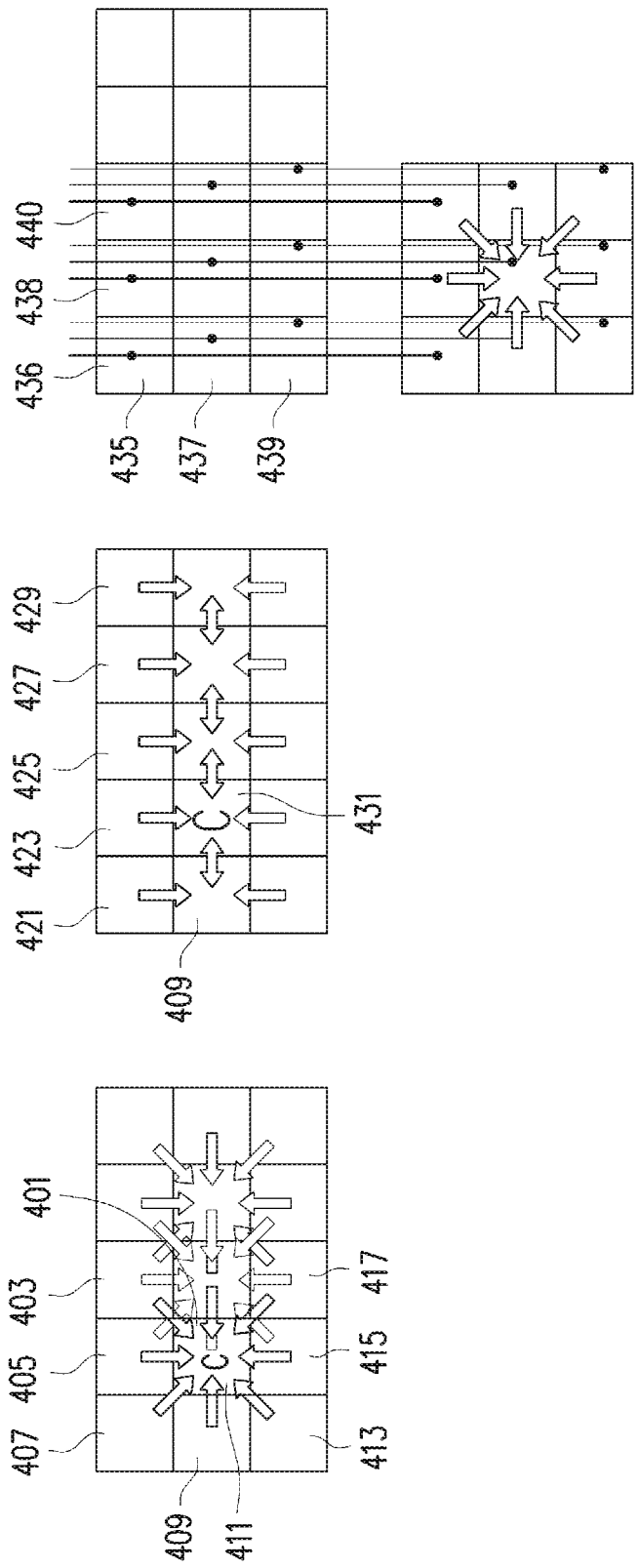
FIGS. 4A-4C illustrates a block diagram of row or column wise pixel activation method, in accordance with some embodiments.

FIGS. 4A-4C illustrate a block diagram of pixel wise activation of pixels for a correlation detection process, in accordance with some embodiments. As shown in FIG. 4A, for each central pixel, a photon detection or SPAD avalanche events are collected using the 3 by 3 pixel wise inter-correlation photon detection system. In some embodiments of the present invention, the row control logic may select three adjacent rows in the DTOF sensor array. As such, for a center pixel 411, photon detection or SPAD avalanche events are collected from pixels 401, 405, 409, and 415, which are orthogonally adjacent to the center pixel 411 and from pixels 403, 407, 413, and 417, which are diagonally adjacent to the center pixel 411. In this embodiment, for each center pixel in the DTOF sensor array, photon detection or SPAD avalanche events are collected from the orthogonally and diagonally adjacent pixels associated with the center pixel.

FIG. 4B shows an alternative method of collecting photon detection or SPAD avalanche events from adjacent pixels. For example, as shown in FIG. 4B, for each selected row of pixels 419, photon detection or SPAD avalanche events are collected from orthogonally adjacent column pixels 421, 423, 425, 427, and 429. Subsequently, according to FIG. 4B, for pixel 431 of the selected row of pixels 419, combined photon detection or SPAD avalanche events from horizontally adjacent pixels are collected form each pixel in the selected row of pixels 419. In accordance with another embodiment of the present invention, as shown in FIG. 4C, the row and column control logic may select a 3 by 3 subarray of the DTOF sensor array by activating rows 435, 437, and 439 and columns 436, 438, and 440. In this embodiment, photon detection or SPAD avalanche events are collected from pixels orthogonally and diagonally adjacent to the center pixel.

Figure 5:
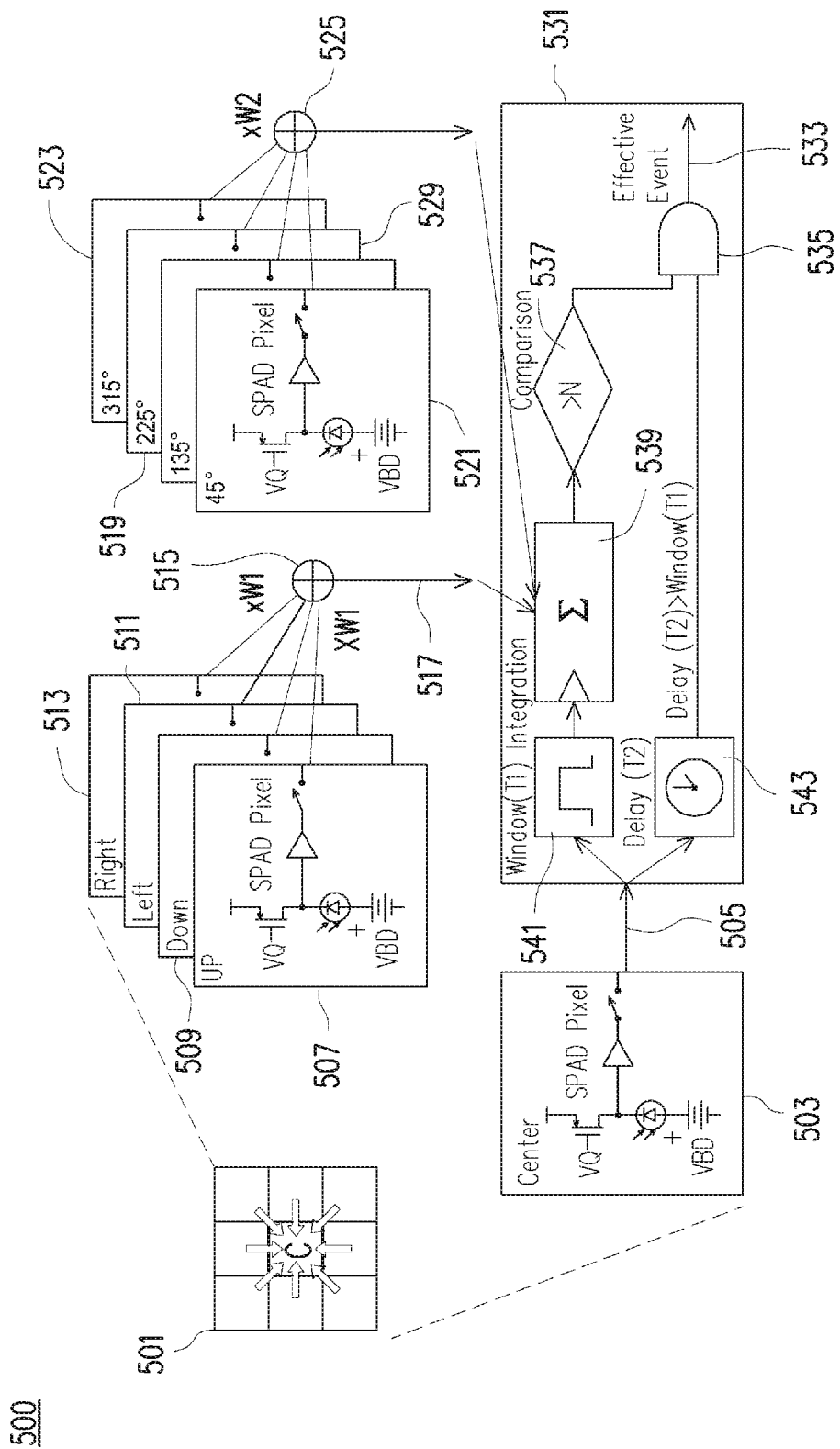
FIG. 5 illustrates a block diagram of a 3 by 3 pixel wise inter-correlation photon detection system, in accordance with some embodiments.

FIG. 5 illustrates a block diagram of a 3 by 3 pixel wise signal processing circuit 500, in accordance with some embodiments of the invention. In some embodiments, the pixel wise signal processing circuit 500 illustrated in FIG. 5 filters false photon event detection signals. For example, in accordance with one embodiment, signals generated by the 3×3 subarray 501 are processed by multiplying a first set of signals generated by pixels 507, 509, 511 and 513 located orthogonally adjacent to the center pixel 503 with a first predetermined parameter ($W_1$) and a second set of signals generated by pixels 519, 521, 523, and 529 located diagonally adjacent to the center pixel 303 with a second predetermined parameter ($W_2$). In some embodiments, the first and second predetermined parameters $W_1$ and $W_2$, may be scalars. In other embodiments, the first and second predetermined parameters $W_1$ and $W_2$, may be vectors of length four with distinct or identical elements. For example, the first predetermined parameter $W_1$ may be a vector $W_1=(w_1^1, w_2^1, w_3^1, w_4^1)$ with identical or distinct elements $w_1^1, w_2^1, w_3^1, w_4^1$ and the second predetermined parameter $W_2$ may be a vector $W_2=(w_1^2, w_2^2, w_3^2, w_4^2)$ with identical or distinct elements $w_1^2, w_2^2, w_3^2, w_4^2$.

As shown in FIG. 5, the first and second set of signals, after scaling with the first and second predetermined parameters $W_1$ and $W_2$, are combined in adders 515 and 525, respectively. Respective outputs 517 and 527 of the adders 515 and 525 are transmitted into a pixel wise inter-correlation photon counter logic 539 implemented within a pixel wise signal processing circuit 531. In addition, the pixel wise signal processing circuit 531 may include a thresholding logic 537. In this regard, the thresholding logic 537 compares the output of the counter logic 539 with a predetermined threshold N and outputs a valid signal if the output of the counter logic 539 is greater than the predetermined threshold N. In various embodiments of the present disclosure, the pixel wise signal processing circuit 531 may also include a delay block 543 that delays a signal 505 received from the center pixel 503 by an amount of time $T_2$. In general, the delay amount $T_2$ is greater than a pulse window 541 of the signal 505. Furthermore, the pixel wise signal processing circuit 531 may also include an AND gate 535 that outputs a valid photon event detection signal 533 if the center 503 pixel generates a photon event detection signal and the output of the thresholding logic 537 is valid.

Figure 6:
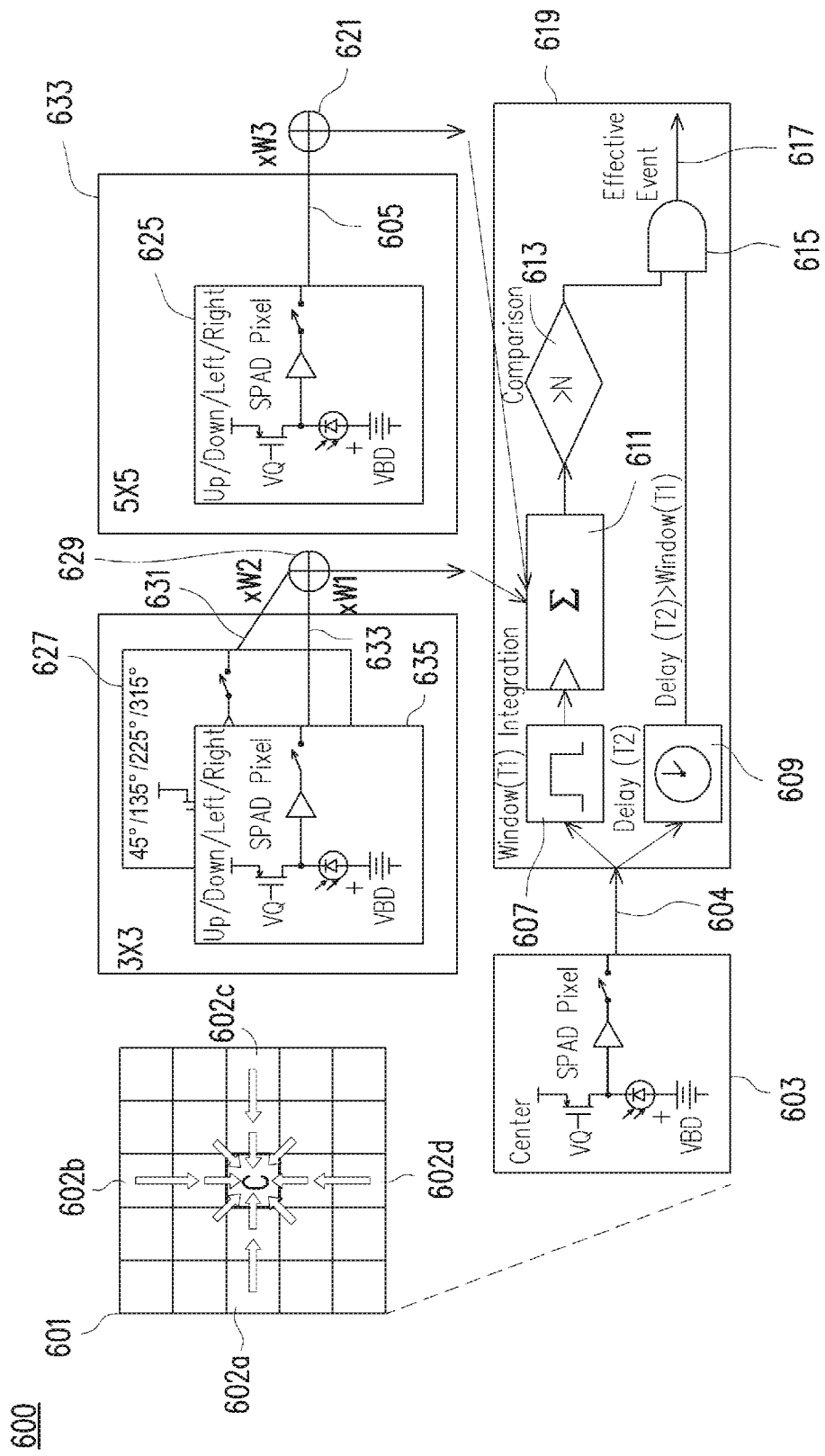
FIG. 6 illustrates a block diagram of a 5 by 5 pixel wise inter-correlation photon detection system, in accordance with some embodiments.

FIG. 6 illustrates a block diagram of a 5 by 5 pixel wise signal processing circuit 600, in accordance with some embodiments of the invention. For example, in accordance with one embodiment, signals generated by a 5×5 subarray 601 are processed by multiplying a first set of signals 633, generated by a plurality of pixels 635 orthogonally adjacent to the center pixel 603 and within the 3×3 subarray embedded centered at the center pixel 603 with the center pixel 603, with a first predetermined parameter ($W_1$) and a second set of signals 631, generated the plurality pixels 627 diagonally adjacent to the center pixel 603 and within the 3×3 subarray, with a second predetermined parameter ($W_2$). Furthermore, as shown in FIG. 6, a third set of signals 605, generated by pixels 602a-602d located on the periphery of the 5×5 subarray 601 and orthogonally adjacent to the center pixel 603. In some embodiments, the first, second, and third predetermined parameters $W_1$, $W_2$, and $W_3$ may be scalars. In other embodiments, the first, second, and third predetermined parameters $W_1$, $W_2$, and $W_3$ may be vectors of length four with distinct or identical elements.

As shown in FIG. 6, the first and second set of signals 633 and 631, after scaling with the first and second predetermined parameters $W_1$ and $W_2$, are combined in the adder 629. Furthermore, the third set of signals 605, after scaling with the third predetermined parameter $W_3$ are combined in the adder 621. Outputs of the adders 629 and 621 are transmitted into a pixel wise inter-correlation photon counter logic 611 implemented within a pixel wise signal processing circuit 619. In addition, the pixel wise signal processing circuit 619 may include a thresholding logic circuit 613. In this regard, the thresholding logic circuit 613 compares the output of the counter logic circuit 611 with a predetermined threshold N. In various embodiments of the present disclosure, the pixel wise signal processing circuit 619 may also include a delay block 609 that delays a signal 604 received from the center pixel 603 by an amount of time $T_2$. In general, the delay amount $T_2$ is greater than a pulse window 607 of the signal 604. Furthermore, the pixel wise signal processing circuit 619 may also include an AND gate 615 that outputs a valid photon event detection signal 617 if the center 603 pixel generates a photon event detection signals and the output of the thresholding logic 613 is valid.

FIGS. 7A-7C show single pixel histograms of detected photon events with respect to obtained TDC measurements for various predetermined thresholds, in accordance with some embodiments. FIG. 7A illustrates a single pixel histogram 701a with a valid photon detection peak signal 703a obtained from a DTOF sensor array without an inter-correlation photon detection system. In addition, false photon event detection signals due to noise are also shown in FIG. 7A. In this regard, the noise floor 707a is lower than the valid photon detection peak signal 703a by an amount 705a. Moreover, given the valid photon detection peak signal (703a) and the noise floor 707a, various figures of merits such as signal-to-noise ratio (SNR) can be calculated. FIG. 7B illustrates a single pixel histogram 701b with a valid photon detection peak signal 703b obtained from a DTOF sensor array comprising of an inter-correlation photon detection system with a preset threshold of N=2, in accordance with various embodiment of the inventions. Furthermore, correlation coefficients $a_1(W_1)$ and $a_2(W_2)$ are set to 1 and 1, respectively. In this embodiment, the noise floor 707b is lower than the valid photon detection peak signal 703b by an amount 705b, which is larger than the amount 705a shown in FIG. 7A. Thus, the resulting SNR in the embodiment illustrated in FIG. 7B is larger than the SNR in the embodiment of FIG. 7A. FIG. 7C illustrates a single pixel histogram 701c with a valid photon detection peak signal 703c obtained from a DTOF sensor array comprising an inter-correlation photon detection system with a preset threshold of N=4, in accordance with various embodiment of the inventions. Furthermore, in this embodiment, the correlation coefficients $a_1(W_1)$ and $a_2(W_2)$ are set to 2 and 1, respectively. As shown in FIG. 7C, the noise floor 707c is lower than the valid photon detection peak signal 703c by an amount 705c, which is larger than the amount 705a or 705b shown in FIGS. 7A-7B. Thus, the resulting SNR in the embodiment illustrated in FIG. 7C is larger than the SNR in the embodiment of FIG. 7A or 7B.

FIGS. 8A-8B illustrate flow diagrams of false photon count filtering methods implemented in the DTOF sensor, in accordance with some embodiments. For example, FIG. 8A illustrates the flowchart of the false photon count filtering method using a 3 by 3 pixel wise inter-correlation photon detection system. In accordance with various embodiments, at step 801, the DTOF sensor activates three successive pixel rows in the two dimensional DTOF array during each DTOF acquisition frame and senses the reflected signal incident on the activated pixels. In other embodiments, at step 801, the DTOF sensor may activates all pixels in the two dimensional DTOF array during each DTOF acquisition frame and senses the reflected signal incident on the activated pixels. Next, at step 803, for each pixel, a photon event detection signal or SPAD avalanche event is collected using 3 by 3 pixel wise inter-correlation photon detection system. At step 807, for each pixel a valid photon event detection signals is reported, when the total number of the photon event detection signals or SPAD avalanche events collected by the pixel wise inter-correlation system is greater than a preset threshold. At step 809, the valid time-of-flight measurement is digitized by a TDC.

As another example, FIG. 8B illustrates the flowchart of the false photon count filtering method using a 5 by 5 pixel wise inter-correlation photon detection system. In accordance with various embodiments, at step 811, the DTOF sensor activates five successive pixel rows in the two dimensional DTOF array during each DTOF acquisition frame and senses the reflected signals incident on the activated pixels. In other embodiments, at step 811, the DTOF sensor may activate all pixel in the two dimensional DTOF array during each DTOF acquisition frame and sense the reflected signal incident on the activated pixels. Next, at step 813, for each pixel, a photon event detection signal or SPAD avalanche event is collected using 5 by 5 pixel wise inter-correlation photon detection system. At step 815, for each pixel, a valid photon event detection signals is reported when the total number of the photon event detection signals or SPAD avalanche events collected by the pixel wise inter-correlation system is greater than a preset threshold. At step 817, the valid time-of-flight measurement is digitized by a TDC.

Figure 9:
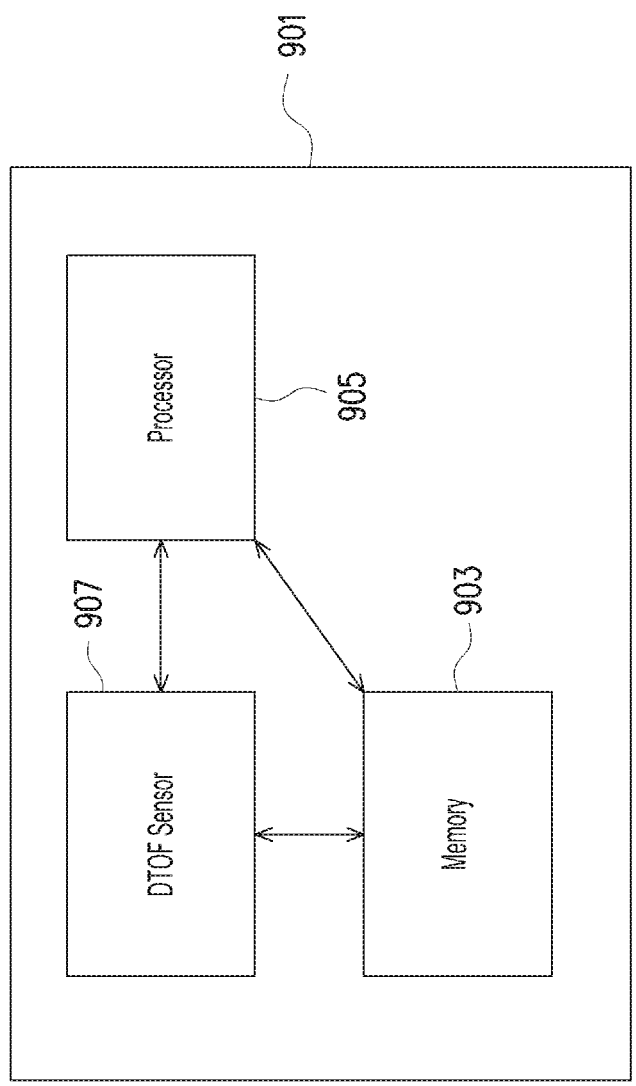
FIG. 9 illustrates a block diagram of a DTOF ranging system, in accordance with some embodiments.

FIG. 9 illustrates a block diagram of a ranging system 901, in accordance with various embodiments of the invention. In some embodiments, the ranging system 901 may be a Light Detection and Ranging (LiDAR) sensor configured to implement the various methods described herein. In other embodiments, the ranging system 901 may be implemented in unmanned autonomous ground and air vehicles. Moreover, the ranging system 901 may also be implemented in a 3D object recognition system. As shown in FIG. 9, the ranging system 901 includes a processor 905, a memory 903, and a DTOF sensor 907.

In some embodiments, the DTOF sensor 907 is implemented as one of the DTOF sensors described above in connection with FIGS. 5 and 6. In some embodiments, the processor 905 controls the general operation of the 901 ranging system. Moreover, the processor 905 executes image processing and classification algorithms on the data received from the DTOF sensor 907. The processor 905 can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 903, which can include both read-only memory (ROM) and random access memory (RAM), can provide instructions and data to the processor 905. A portion of the memory 903 can also include non-volatile random access memory (NVRAM). The processor 905 typically performs logical and arithmetic operations based on program instructions stored within the memory 903. The instructions (a.k.a., software) stored in the memory 903 can be executed by the processor 905 to perform the methods described herein. The processor 905 and memory 903 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

Figure 10A:
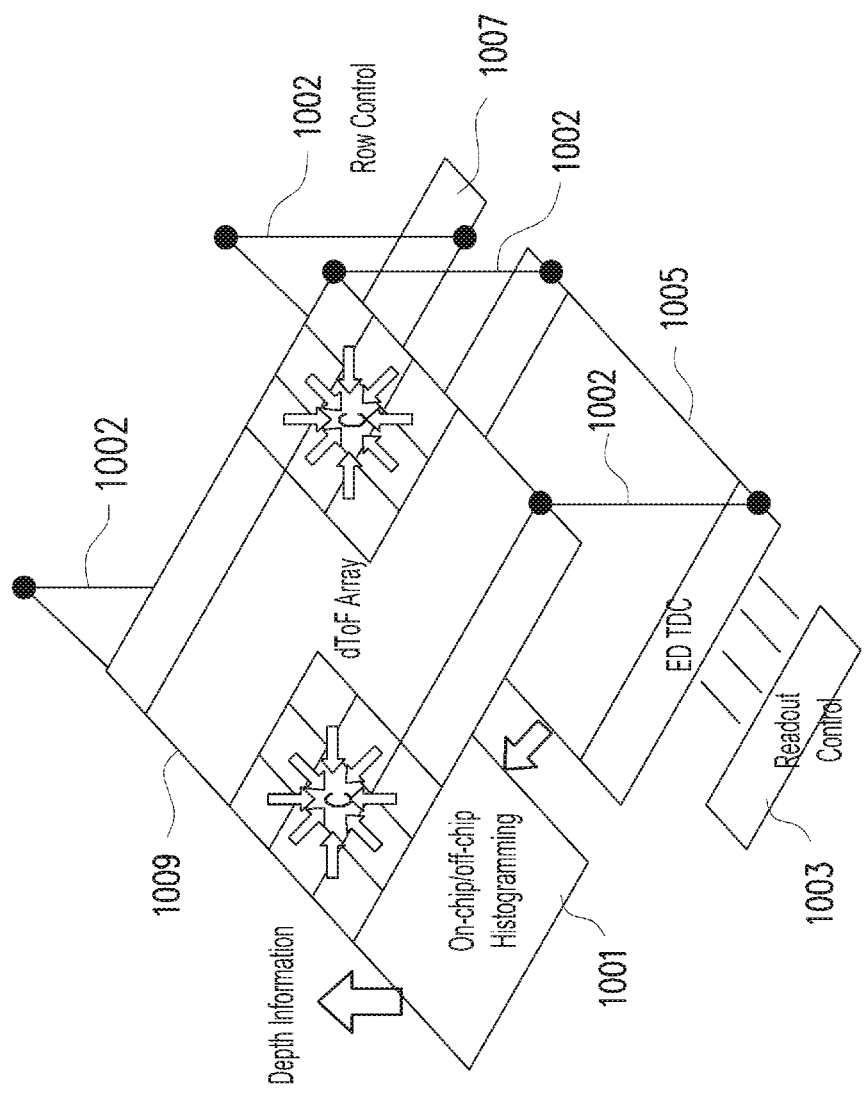
FIGS. 10A-10B are schematic diagrams illustrating 3D floor plans of an exemplary DTOF sensor.

FIG. 10A shows a schematic diagram of a 3D floor plan of an exemplary DTOF sensor. In some embodiments, the illustrated 3D floor plan of FIG. 10A includes a SPAD array 1009 comprising of a rectangular array of reversed biased avalanche diodes. In various embodiments, the SPAD array 1009 by may be integrated on a silicon substrate of a semiconductor device with auxiliary components such as readout control circuitry 1003, row control circuitry 1007, associated time-to-digital conversion (TDC) circuitry 1005, and histogramming circuitry 1001. Although these various auxiliary components 1001, 1003, 1005, and 1007 may be silicon-based, it is understood that these silicon based components may include non-silicon and/or silicon alloy materials such as various oxides, insulators, or dielectrics (e.g., silicon oxides, nitrides, or oxynitrides, or non-silicon-containing dielectrics), various silicon alloys (e.g., silicon-germanium or silicon-germanium-carbon alloys), layers of metals or metal alloys, or so forth. Furthermore, in various embodiments, the SPAD array 1009 and the auxiliary components 1001, 1003, 1005, and 1007 may be fabricated on different metal layers. For example, the SPAD array 1009 may be patterned or etched on a top opaque layer of the semiconductor device and the auxiliary components 1001, 1003, 1005, and 1007 may be patterned or etched on a lower metal layer.

In other embodiments, the SPAD array 1009 and the auxiliary components 1001, 1003, 1005, and 1007 may be fabricated on stacked wafers bonded together to form a DTOF sensor on a semiconductor device. The stacked wafers may include silicon, gallium arsenide, or other semiconductor materials, in accordance with various embodiments. In the illustrated example, a top wafer may include the SPAD array 1009, while a bottom wafer may include the auxiliary components 1001, 1003, 1005, and 1007. In other embodiments, the placement of the auxiliary digital components 1001, 1003, 1005, and 1007 on the bottom wafer allows for a very high fill factor in the SPAD array 1009 on the top wafer. Moreover, since the top wafer may be formed separately from the bottom wafer, custom fabrication processes may be utilized to optimize the formation of the SPAD array 1009 on the top wafer, while traditional CMOS processes may be retained when forming the auxiliary digital components 1001, 1003, 1005, and 1007 on the bottom wafer.

In some embodiments, the SPAD array 1009 may be coupled to the associated TDC circuitry 1005 by way of metal traces 1002. In one embodiment, the metal traces 1002 may include micro-through silicon vias (μTSVs). The μTSVs may include a conductive material (e.g., copper, poly-silicon, etc.) deposited therein. As shown in FIG. 10A, at least one metal trace for each row of the SPAD array 1009 may be fabricated to transfer output pulses generated by each row of the SPAD array 1009 to the associated TDC circuitry 1005 of the bottom wafer. In various embodiments, the metal traces 1002 may include a redistribution layer (RDL) comprising a thin-film (e.g., aluminum, copper, etc.) for rerouting and redistributing electrical connections between the SPAD array 1009 and the associated TDC circuitry 1005.

Figure 10B:
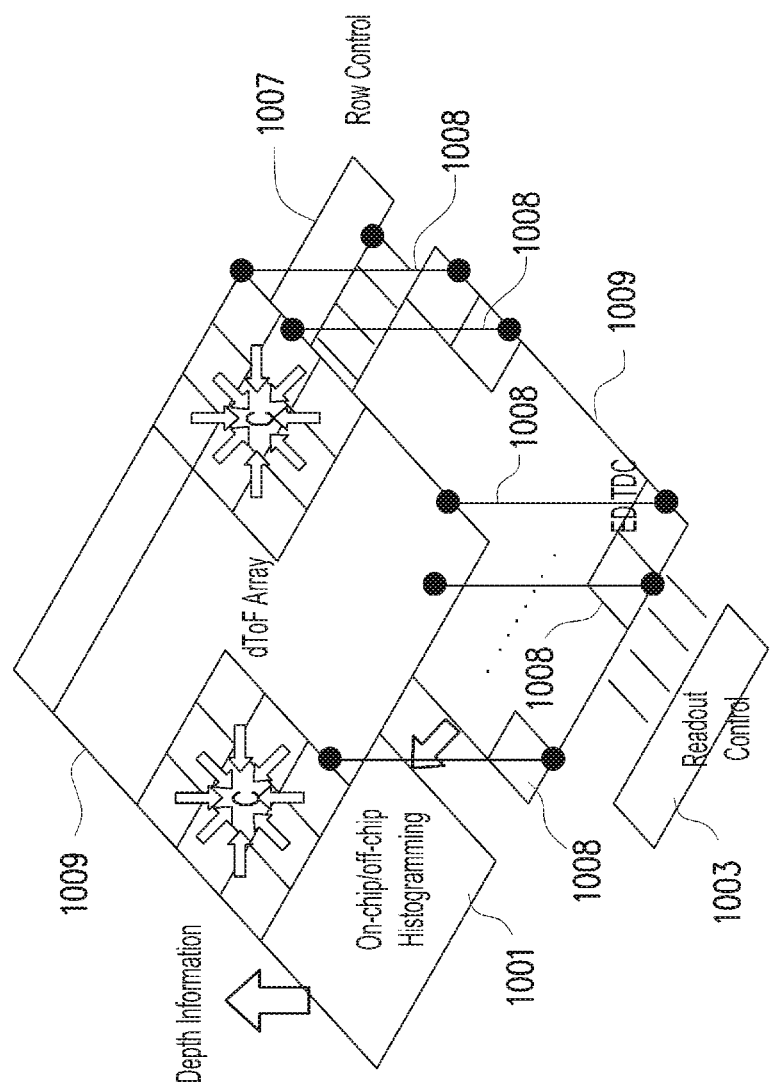

FIG. 10B shows a schematic diagram of a 3D floor plan of one possible implementation of the DTOF sensor. The exemplary 3D floor plan shown in FIG. 10B is similar to the 3D floor plan of FIG. 10A discussed above. However, the 3D floor plan of FIG. 10B includes additional metal traces 1008 connecting each pixel in the SPAD array 1009 to a TDC that is integrated within a rectangular array of TDCs 1009. More specifically, in the 3D floor plan of FIG. 10B, each pixel in the SPAD array is connected, via the metal traces 1008, to an associated TDC. As such, the 3D floor plan of FIG. 10B provides both individualized readout and individualized time stamping for each SPAD detector.

FIG. 11A schematically illustrates a planer floor plan of an exemplary DTOF sensor. In some embodiments, the planer floor plan of an exemplary DTOF sensor may include a two-dimensional ("2D") SPAD pixel array 1103. As illustrated, each pixel is arranged into a row and a column to acquire image data of a person, place, or object. Additionally, the planer floor plan shown in FIG. 11A may include row control circuitry 1101 configured to receive row addresses from a row control circuitry 1007 (FIGS. 10A-10B) and supply corresponding row control signals such as reset, row-select, charge transfer, dual conversion gain, and readout control signals to the SPAD pixel array 1103 over row control paths 1102. Moreover, the planer floor plan shown in FIG. 11A may also include a column control circuitry 1105 coupled to each column of the SPAD pixel array 1103 through one or more conductive lines 1104. In this regard, the one or more conductive lines may be used for reading out image signals from the SPAD pixel array 1103 and for supplying bias signals (e.g., bias currents or bias voltages) to pixels in the SPAD pixel array 1103. In some embodiments, during pixel readout operations, a pixel row in the SPAD pixel array 1103 may be selected using the row control circuitry 1101 and image signals generated by image pixels in that pixel row can be read out along the one or more conductive lines 1104.

In various embodiments, the planer floor plan of FIG. 11A may include an image readout circuitry comprising one or more time-to-digital converter (TDC) circuitry 1107 and a phase-locked loop (PLL) based time reference generation module 1102. Moreover, the TDC circuitry 1107 may be configured to measure the time of flight and generate a time stamp for photon detection events at a resolution greater than a reference clock period. In some embodiments, the PLL module 1102 may is suitable for providing the clock signals for the one or more TDC circuitry 1107. A PLL based timing reference module 1102 is shown in FIG. 11A for illustration only and the timing references for the one or more TDC circuitry 1107 may be generated using parallel outputs from any suitable timing module; for example a delay locked loop (DLL), active delay line, passive delay line, etc.

FIG. 11B shows a planer floor plan of another possible implementation of the DTOF sensor. The exemplary planer floor plan shown in FIG. 11B is similar to the planer floor plan of FIG. 11A discussed above. However, the planer floor plan of FIG. 11B includes time-to-amplitude converters (TACs) 1109 configured to measure the time difference between the start signal and the stop signal which are fed into the TACs 1109. In some embodiments, the TACs 1109 output an analog voltage signals whose signal heights are proportional to the time differences measured between the receipt of the start signals and the stop signals. In further embodiments, the outputted analog signals can then either be further processed in analog form or, for example, be digitized by a downstream analog-digital converter (ADC). Additionally, as shown in FIG. 11B, the planer floor plan may include a ramp integrator 1108 connected to the TACs 1109 and configured to initiate a ramp signal after the TACs 1109 receive the start signals. After a stop signal is received, the ramp integrator 1108 reaches a fixed voltage value that is proportional to the time interval between receipt of the start signal and the stop signal.

FIG. 11C shows a planer floor plan of another possible implementation of the DTOF sensor. The exemplary planer floor plan shown in FIG. 11C is similar to the planer floor plan of FIG. 11A discussed above. However, the planer floor plan of FIG. 11C includes a single TDC 1110 connected to the column control circuitry 1105. In some embodiments, TDC 1110 may be configured to detect and generate a time stamp for a photon detection event in any pixel from a selected row of pixels.

FIG. 12A schematically illustrates a planer floor plan of an exemplary DTOF sensor with time amplifiers (TA) 1207 connected between the SPAD pixel array 1103 and counter based TDCs 1203. As shown in FIG. 12A, the planer floor plan may include a reference clock 1201. In this embodiment, the time resolution of each counter based TDCs 1203 is determined by the frequency the reference clock 1201 and its quantization error is dependent on the reference clock's 1201 period. Moreover, the counter based TDCs 1203 may be implemented by asynchronous binary counters controlled by a start and a stop pulse. For example, asynchronous binary counters of the TDCs 1203 may be driven by the reference clock 1201 and reset by the start pulses. The outputs of the asynchronous binary counters may be sampled by the stop pulses. The sampled data from the asynchronous binary counters are the digital output proportional to the time difference between start and stop pulses. In some embodiments, the stop pulse may be triggered by a pixel in the SPAD pixel array 1103 that detects a photon event and the start pulse may be triggered when a modulated light is emitted.

Higher resolution DTOF sensors require an ability to measure time of flight with greater accuracy. As such, the planer floor plan shown in FIG. 12A may include TAs 1207 configured to amplify the input time difference at the output and thus, improving the resolution and dynamic range of the counter based TDCs 1203.

FIG. 12B shows a planer floor plan of another possible implementation of the DTOF sensor with time amplifiers (TA) 1207. The exemplary planer floor plan shown in FIG. 12B is similar to the planer floor plan of FIG. 12A discussed above. However, the planer floor plan of FIG. 12B includes a time-to-amplitude converters (TACs) 1109 and a slow ramp integrator 1205 connected to the TACs 1109 and configured to initiate a slow ramp signal after the TACs 1109 receive the start signals.

FIG. 12C shows a planer floor plan of another possible implementation of the DTOF sensor with a time amplifier (TA) 1207. The exemplary planer floor plan shown in FIG. 12C is similar to the planer floor plan of FIG. 12A discussed above. However, the planer floor plan of FIG. 12C includes a single TDC 1110 connected to the column control circuitry 1105 through the TA 1207.

In some embodiments, the present invention provides an apparatus for measuring a distance from an object that includes a light source configured to emit a modulated signal towards the object and a direct time of flight (DTOF) sensor array configured to receive a reflected signal from the object, wherein the DTOF sensor array includes a plurality of single-photon avalanche diodes (SPADs). Moreover, in this embodiment, the apparatus for measuring the distance from the object may include a processing circuitry operable to receive, from a center pixel and a plurality of pixels orthogonally and diagonally adjacent to the center pixel, photon event detection signals and output a valid photon detection signal, in response to determining whether a sum of the received photon event detection signals is greater than a predetermined threshold. Furthermore, in other embodiments, an apparatus for measuring a distance from an object may include a row control logic circuit configured to select a row of pixels in the DTOF sensor array and a column control logic circuit configured to select a column of pixels in the DTOF sensor array.

In some embodiments, a signal processing apparatus for processing pixel wise signals received from a direct time of flight (DTOF) sensor array, includes: a pixel wise signal processing circuit coupled to the DTOF sensor array and configured to: receive, from a center pixel and a plurality of pixels orthogonally and diagonally adjacent to the center pixel, photon event detection signals, and output a valid photon detection signal, in response to determining whether a sum of the received photon event detection signals is greater than a predetermined threshold; a time to digital converter (TDC) configured to quantize a time interval between rising edges of an emitted modulated signal and a reflected signal incident on a the central pixel in response to receiving the valid photon detection signal; and a histogramming logic circuit configured to: accumulate a plurality of quantized time measurements received from the TDC during a plurality of acquisition frames, and determine a depth information based on a statistical distribution of the plurality of the quantized time measurements.

In further embodiments, the signal processing apparatus may further include a row control logic circuit configured to select a row of pixels in the DTOF sensor array, and a column control logic circuit configured to select a column of pixels in the DTOF sensor array.

In other embodiments, a method for measuring a distance to an object from in a direct time of flight (DTOF) sensor array, includes: receiving, from a center pixel and a plurality of pixels orthogonally and diagonally adjacent to the center pixel, photon event detection signals; outputting a valid photon detection signal, in response to determining whether a sum of the received photon event detection signals is greater than a predetermined threshold; quantizing, using a time to digital converter (TDC), a time interval between rising edges of an emitted modulated signal and a reflected signal incident on a the central pixel in response to receiving the valid photon detection signal; accumulating a plurality of quantized time measurements received from the TDC during a plurality of acquisition frames; and determining a depth information based on a statistical distribution of the plurality of the quantized time measurements.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations are used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, signal, etc. that is physically constructed, programmed, arranged and/or formatted to perform the specified operation or function.

Furthermore, a person of ordinary skill in the art would understand that various illustrative logical blocks, modules, devices, components and circuits described herein can be implemented within or performed by an integrated circuit (IC) that can include a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A processor programmed to perform the functions herein will become a specially programmed, or special-purpose processor, and can be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. An apparatus for measuring a distance to an object, the apparatus comprising:
    a light source configured to emit a modulated signal towards the object;
    a direct time of flight (DTOF) sensor array configured to receive a reflected signal from the object, wherein the DTOF sensor array comprises a plurality of single-photon avalanche diodes (SPADs); and
    processing circuitry coupled to the DTOF sensor array and configured to:
        receive, from a center pixel and a plurality of pixels orthogonally and diagonally adjacent to the center pixel, photon event detection signals,
        output a valid photon detection signal, in response to determining whether a sum of the received photon event detection signals is greater than a predetermined threshold.

2. The apparatus of claim 1, wherein the processing circuitry further comprises:
    a row control logic circuit configured to select a row of pixels in the DTOF sensor array; and
    a column control logic circuit configured to select a column of pixels in the DTOF sensor array.

3. The apparatus of claim 2, wherein the processing circuitry further comprises:
    a time to digital converter (TDC) configured to quantize a time interval between rising edges of the emitted modulated signal and the reflected signal incident on a pixel selected by the row and column control logic circuits.

4. The apparatus of claim 3, wherein the processing circuitry further comprises:
    a histogramming logic circuit configured to accumulate, for each pixel in the DTOF sensor array, a plurality of quantized time measurements received from the TDC during a plurality of acquisition frames.

5. The apparatus of claim 1, wherein the processing circuitry is further configured to scale a first set of photon event detection signals received from pixels orthogonally adjacent to the center pixel with a first predetermined parameter and a second set of signal photon event detection signals received from pixels diagonally adjacent to the center pixel with a second predetermined parameter.

6. The apparatus of claim 5, wherein the processing circuitry is further configured to scale, with a third predetermined parameter, a third set of photon event detection signals received from pixels located on a periphery of a 5 by 5 rectangular subarray centered at the center pixel and orthogonally adjacent to the center pixel.

7. The apparatus of claim 6, wherein the processing circuitry further comprises a thresholding logic circuit configured to determine whether a sum of the scaled first, second, and third sets of photon event detection signals is greater than the predetermined threshold.

8. The apparatus of claim 7 further comprising:
a logical AND gate configured output a valid photon event detection, in response to receiving a signal from the thresholding logic circuit indicating that the sum of the scaled first, second, and third sets of photon event detection signals is greater than the predetermined threshold and a delayed photon event detection signal from the center pixel.

9. The apparatus of claim 1, wherein the predetermined threshold is an integer greater than 1.

10. A signal processing apparatus for processing pixel wise signals received from a direct time of flight (DTOF) sensor array, the signal processing apparatus comprising:
a pixel wise signal processing circuit coupled to the DTOF sensor array and configured to:
receive, from a center pixel and a plurality of pixels orthogonally and diagonally adjacent to the center pixel, photon event detection signals, and
output a valid photon detection signal, in response to determining whether a sum of the received photon event detection signals is greater than a predetermined threshold;
a time to digital converter (TDC) configured to quantize a time interval between rising edges of an emitted modulated signal and a reflected signal incident on a the central pixel in response to receiving the valid photon detection signal; and
a histogramming logic circuit configured to:
accumulate a plurality of quantized time measurements received from the TDC during a plurality of acquisition frames, and
determine a depth information based on a statistical distribution of the plurality of the quantized time measurements.

11. The signal processing apparatus of claim 10, further comprises:
a row control logic circuit configured to select a row of pixels in the DTOF sensor array; and
a column control logic circuit configured to select a column of pixels in the DTOF sensor array.

12. The signal processing apparatus of claim 10, wherein the pixel wise signal processing circuit is further configured to scale a first set of photon event detection signals received from pixels orthogonally adjacent to the center pixel with a first predetermined parameter and a second set of signal photon event detection signals received from pixels diagonally adjacent to the center pixel with a second predetermined parameter.

13. The method of claim 12 further accumulates a plurality quantized time measurements received from the TDC during a plurality of acquisition frames into a histogram.

14. The signal processing apparatus of claim 10, wherein the pixel wise signal processing circuit is further configured to scale, with a third predetermined parameter, a third set of photon event detection signals received from pixels located on a periphery of a 5 by 5 rectangular subarray centered at the center pixel and orthogonally adjacent to the center pixel.

15. The signal processing apparatus of claim 10, wherein the statistical distribution comprises frequencies of occurrences of the plurality of the quantized time measurements.

16. The method of claim 10, wherein the predetermined threshold is an integer greater than 1.

17. A method for measuring a distance to an object from in a direct time of flight (DTOF) sensor array, the method comprising:
receiving, from a center pixel and a plurality of pixels orthogonally and diagonally adjacent to the center pixel, photon event detection signals;
outputting a valid photon detection signal, in response to determining whether a sum of the received photon event detection signals is greater than a predetermined threshold
quantizing, using a time to digital converter (TDC), a time interval between rising edges of an emitted modulated signal and a reflected signal incident on a the central pixel in response to receiving the valid photon detection signal;
accumulating a plurality of quantized time measurements received from the TDC during a plurality of acquisition frames; and
determining a depth information based on a statistical distribution of the plurality of the quantized time measurements.

18. The method of claim 17 further comprising:
scaling a first set of photon event detection signals received from pixels orthogonally adjacent to the center pixel with a first predetermined parameter and a second set of signal photon event detection signals received from pixels diagonally adjacent to the center pixel with a second predetermined parameter.

19. The method of claim 18 further comprising:
scaling, with a third predetermined parameter, a third set of photon event detection signals received from pixels located on a periphery of a 5 by 5 rectangular subarray centered at the center pixel and orthogonally adjacent to the center pixel.

20. The method of claim 19 further comprising:
determining whether a sum of the scaled first, second, and third sets of photon event detection signals is greater than the predetermined threshold.

* * * * *